United States Patent [19]

Hirokawa et al.

[11] Patent Number: 4,772,348

[45] Date of Patent: Sep. 20, 1988

[54] METHOD OF MAKING A GAS BARRIER LAMINATE

[75] Inventors: Atsushi Hirokawa, Toda; Keisuke Kaiho, Tokorozawa, both of Japan

[73] Assignee: Toyo Ink Mfg. Co., Japan

[21] Appl. No.: 75,274

[22] Filed: Jul. 20, 1987

Related U.S. Application Data

[63] Continuation of Ser. No. 763,665, Aug. 8, 1985, abandoned.

[51] Int. Cl.$^4$ .................. B32B 31/12; B32B 31/22; B32B 31/28
[52] U.S. Cl. .................. 156/272.6; 156/273.3; 156/308.2; 156/309.9; 156/320; 204/165; 427/40
[58] Field of Search .................. 156/99, 106, 272.2, 156/182, 272.6, 275.5, 308.2, 309.6, 309.9, 273.3, 320; 427/39–41; 428/412, 515, 520; 525/60, 61; 204/164, 165, 168

[56] References Cited

U.S. PATENT DOCUMENTS

| | | | |
|---|---|---|---|
| 4,137,364 | 1/1979 | Ball | 428/412 |
| 4,410,595 | 10/1983 | Matsumoto | 428/412 |
| 4,475,241 | 10/1984 | Mueller | 428/412 |
| 4,504,349 | 3/1985 | Ueno | 156/272.6 |
| 4,511,627 | 4/1985 | Tanuma | 428/429 |
| 4,559,216 | 12/1985 | Misasa | 428/412 |
| 4,572,860 | 2/1986 | Nakamura | 428/412 |

*Primary Examiner*—Merrell C. Cashion, Jr.
*Attorney, Agent, or Firm*—Lorusso & Loud

[57] ABSTRACT

The disclosed laminate includes a layer of a saponified copolymer of ethylene and vinyl acetate thermally bonded directly (without use of an adhesive) to a layer of thermoplastic with a high interlayer adhesive strength therebetween. The laminate is produced by pretreating the surface of the thermoplastic layer to be bonded with a low temperature plasma and then thermally bonding the two layers together.

10 Claims, No Drawings

METHOD OF MAKING A GAS BARRIER LAMINATE

This is a continuation of Ser. N0. 763,665 filed Aug. 8, 1985, now abandoned.

BACKGROUND OF THE INVENTION

1. Field of the Invention

The present invention relates to a laminated structure having excellent transparency and gas and vapor impermeability and which is particularly suitable for use as a material for forming containers or as a packaging film or sheet for food products, beverages and pharmaceutical products.

2. Description of the Prior Art

Flexible or rigid packaging materials for packaging food products, beverages or pharmaceutical products are required to meet strict requirements for physical properties to safeguard human health. More specifically, such a packaging material should provide a barrier to gases, water vapor and ultraviolet rays. Further, depending on the intended end use, resistance to cold and/or hot water is desirable. Various laminated structures have been proposed to meet such requirements.

For example, polyester film, particularly, polyethylene terephthalate film is an excellent food packaging material and is used widely in various fields. However, a polyethylene terephthalate (PET) film is an unsatisfactory gas barrier. In order to cover this disadvantage, a polyethylene terephthalate film is conventionally coated with a polyvinylidene chloride or laminated to an aluminum foil, a polyvinyl alcohol film or a saponified ethylene-vinyl acetate copolymer film.

However, an aluminum foil conceals the contents of the package and spoils the attractiveness of the goods, while coating a polyethylene terephthalate film with a polyvinylidene chloride yields a coating with unacceptably low bond strength. Accordingly, laminated films of a polyethylene terephthalate layer and a saponified ethylene-vinyl acetate copolymer layer have become widely used in recent years. Since a polyethylene terephthalate film and a saponified ethylene-vinyl acetate copolymer film will not adhere directly to each other upon coextrusion, they are conventionally laminated using an adhesive. However, polyurethane adhesives, which are commonly used as adhesives for laminating a polyethylene terephthalate film and a saponified ethylene-vinyl acetate copolymer film, present certain problems including the requirement for aging after processing and the possibility that compounds of low molecular weight might migrate into the packaged foodstuff.

To obviate such problems, one method for forming such a laminated film without an adhesive has been proposed. According to the proposed method, a surface of a thermoplastic resin film is treated by a corona discharge, then another thermoplastic resin film is laminated to the treated surface of the former film by hot-pressing, and then the laminated structure is stretched. However, the interlayer adhesive strength of such a laminated film is as low as 200 g/15 mm, and hence delamination is liable to occur. Furthermore, as a practical matter, the two or more component layers of the laminate must have an overlapping stretchable temperature range, and hence only a limited number of film combinations are possible. Therefore, a laminated film produced by such a process is unsuitable for uses in which it would be subjected to hot-forming or heat-sterilization, and accordingly, there are many restrictions on the practical applications of such a conventional laminated film.

SUMMARY OF THE INVENTION

Accordingly, it is an object of the present invention to solve the foregoing problems and to provide a laminate of a film or sheet of a thermoplastic such as polyethylene terephthalate and a film or sheet of a saponified ethylene-vinyl acetate copolymer having high interlayer adhesive strength. Another object is to provide such a laminate by a process that does not require use of an adhesive.

The present invention is based in part on the discovery that the adhesion between a thermoplastic film and a saponified ethylene-vinyl acetate copolymer film or sheet is improved remarkably by a low-temperature plasma treatment of the surface of the thermoplastic film or sheet that is to be laminated to the ethylene-vinyl acetate copolymer film.

Accordingly, the present invention provides a laminated structure by treating a surface of a thermoplastic film or sheet with a low-temperature plasma, then thermally bonding the treated surface of the thermoplastic film or sheet to a saponified ethylene-vinyl acetate copolymer film or sheet or to a laminated film or sheet having at least a facing layer of a saponified ethylene-vinyl acetate copolymer and then, if necessary, uniaxially or biaxially stretching or heat-forming the laminate.

DESCRIPTION OF THE PREFERRED EMBODIMENTS

The choice of thermoplastic film or sheet employed in the present invention is not limited to any particular thermoplastic. Exemplary thermoplastics include polyesters, polyamides, polycarbonates, polyvinyl chloride, polyolefins, polystyrene, polyacrylonitrile and acrylic polymers such as polymethyl methacrylate. Laminated films or sheets having at least one layer of any of such thermoplastics may also be used. The material, thickness and stretched condition of the component films are selected in accordance with the intended use of the laminated structure. When the thermoplastic film or sheet is itself a laminate, it is preferable, for the above-mentioned reasons, that its constituent layers not be laminated with any polyurethane adhesive. When the laminated structure of the present invention is to be used for packaging foodstuffs, it is preferable from the viewpoint of physical properties other than gas impermeability that the thermoplastic film or sheet be a film or sheet of a polyamide or polyester, most preferably, polyethylene terephthalate, or a laminated film or sheet having at least one layer of any one of those materials.

The laminated structures of the present invention will preferably have an interlayer adhesive strength of at least 400 g/15 mm (between the thermoplastic layer and adjacent ethylene-vinyl acetate copolymer layer) and an oxygen permeability of no more than 1.0 m$^l$/m$^2$·24 hours at 25 degrees C.

The low-temperature plasma used in forming the laminated structure of the present invention is a plasma produced by glow discharge in a gas at less than atmospheric pressure. The use of a vacuum is one feature that serves to distinguish a low temperature plasma from a typical corona discharge. As those skilled in the art are aware, a "low temperature plasma" is a specific type of plasma wherein only the electrons in the system have high energy. In a "low temperature plasma" the electron temperature (Te) and the gas temperature (Tg) are out of equilibrium, in other words, there is no thermal equilibrium between the two. The conditions for the low-temperature plasma discharge treatment in accordance with the present invention are: a discharge rate of 100W or more, a pressure of $1 \times 10^{-3}$ to 1 Torr and a duration of 0.01 sec or more, preferably, around 0.1 to 10 sec. The gaseous atmosphere is suitably air, argon, nitrogen, oxygen, hydrogen or helium or a mixture of those gases.

It is preferable to effect the in-line low-temperature plasma treatment immediately before thermally bonding. Employment of a continuous plasma treatment system, in particular, ensures high interlayer adhesive strength and high productivity.

The saponified ethylene-vinyl acetate copolymer of the present invention is not limited to any particular saponified ethylene-vinyl acetate copolymer, however, a saponified ethylene-vinyl acetate copolymer containing 20 to 50 mol. % ethylene and having a 90 mol. % or more degree of saponification is preferable from the viewpoint of providing a gas barrier.

Likewise, there is no particular restriction on the nature of laminated film having an outer layer of a saponified ethylene-vinyl acetate copolymer when used. However, for the previously mentioned reason, where such a laminate is used avoidance of a polyurethane adhesive is preferable.

Any conventional thermal bonding technique may be employed. In a preferred embodiment the plasma treated thermoplastic film or sheet surface is extrusion coated with a saponified ethylene-vinyl acetate copolymer to thermally bond together the thermoplastic film or sheet and the layer of the saponified ethylene-vinyl acetate copolymer. However, if desired, the laminated structure of the present invention may be a three-layer laminated structure, having a saponified ethylene-vinyl acetate copolymer layer as the intermediate layer and a polyolefin as the facing layers, formed by coextrsuion of the polyolefin and saponified ethylene-vinyl acetate copolymer. This three-layer laminated structure has a wide range of applications as a packaging material owing to the facility with which the polyolefin forms a heat seal.

A film or sheet of a saponified ethylene-vinyl acetate copolymer or a laminate having at least one outer layer of a saponified ethylene-vinyl acetate copolymer may be prepared beforehand and this film or sheet may be joined to the plasma treated surface of the thermoplastic film or sheet by heat lamination, if necessary, after subjecting the first mentioned film or sheet to uniaxial or biaxial stretching.

Since the stretchable temperature range for polyesters, particularly, polyethylene terephthalate, polyamides, polystyrene and polyacrylonitrile is practically the same as that of a saponified ethylene-vinyl acetate copolymer, a laminate of a film of one of those materials and a saponified ethylene-vinyl acetate copolymer film is capable of being improved further in mechanical strength and gas and water vapor impermeability by uniaxial or biaxial stretching of the laminated structure.

The laminated structure of the present invention can be shaped by a conventional process, such as a vacuum forming process, to form a contractable container for foodstuffs.

Furthermore, as is obvious to those skilled in the art, the laminated structure of the present invention can be laminated, if desired to another packaging film or sheet, to form a composite. For example, a polyolefin film can be laminated to the saponified ethylene-vinyl acetate copolymer layer of the laminated structure of the present invention with an adhesive or adherent polymer or without using any adhesive. Examples of suitable "adherent polymers" are polyolefins containing carboxyl groups and the combination of a polyolefin containing carboxyl groups and a metal compound. When the films and/or sheets require use of an adhesive for lamination, an polyurethane adhesive may be used, however, it is preferable that the superimposed layers be laminated without using an adhesive.

The present invention will be described in more detail hereinafter with reference to preferred embodiments. The values for interlayer adhesive strength were determined by the T peel test.

EXAMPLE 1

The surface of an unstretched polyethylene terephthalate sheet 100 μm in thickness (TETRON FR, Teijin Ltd.) was treated with a low-temperature plasma at 350 W for 10 sec in an atmosphere of nitrogen gas at $5 \times 10^{-3}$ Torr pressure. The plasma-treated surface was extrusion-coated with a saponified ethylene-vinyl acetate copolymer layer (EVAL EPF-101, Kuraray Co., Ltd.) 150 μm in thickness. The interlayer adhesive strength of the laminated structure was 1500 g/15 mm. The laminated structure was stretched biaxially at an areal stretching ratio of 9. The stretched laminated structure had an oxygen gas permeability of 0.1 ml/m$^2$·24 hr at 25° C. and excellent transparency. No delamination of the laminated structure was observed in the biaxial stretching.

COMPARATIVE EXAMPLE 1

Comparative Example 1 was identical to Example 1, except that the low-temperature plasma process was omitted. The interlayer adhesive strength of the resulting laminate, before stretching, was 50 g/15 mm.

COMPARATIVE EXAMPLE 2

Comparative Example 2 was also identical to Example 1, except that a corona discharge at 20W/m$^2$·min was employed instead of the low-temperature plasma process. The laminated structure thus formed was stretched biaxially at an areal stretching ratio of 9. The stretched laminated structure delaminated when crumpled by hand.

COMPARATIVE EXAMPLE 3

The same unstretched polyethylene terephthalante sheet as that used in Example 1 and a sheet of a saponified ethylene-vinyl acetate copolymer 100 μm in thickness (EVAL EPF-101, Kuraray Co., Ltd.) were laminated in a conventional manner using a two-component polyurethane adhesive (EPS-903/KL-75, Dainippon Ink and Chemicals, Inc.) and the resulting laminate was aged at 40° C. for 48 hours. The laminated structure before aging delaminated when subjected to biaxial stretching at an approximately 9 areal stretching ratio. The laminated structure after aging broke immediately upon commencement of stretching.

EXAMPLE 2

A number of laminated structures were formed in accordance with Example 1, except that the conditions for the low-temperature plasma process were varied as shown in Table 1.

TABLE 1

| Atmosphere | Degree of vacuum (Torr) | Discharge rate (W) | Duration (sec) | Interlayer Adhesive Strength (g/15 mm) |
|---|---|---|---|---|
| Argon | $2 \times 10^{-1}$ | 450 | 3 | 700 |
| Oxygen | $5 \times 10^{-3}$ | 300 | 6 | 1200 |
| Air | $5 \times 10^{-2}$ | 500 | 4 | 1000 |
| Argon/oxygen* | $5 \times 10^{-1}$ | 600 | 2 | 600 |

*A mixed gas of 1:1 volume ration

The interlayer adhesive strengths for the respective laminated structures are also shown in Table 1.

EXAMPLE 3

A biaxially stretched polyethylene terephthalate film (Lumirror P-11, Toray Industries, Inc.) 12 μm in thickness was subjected to a low-temperature plasma process at 350 W for 1 sec duration in an atmosphere of argon gas at $1 \times 10^{-2}$ Torr pressure. A uniaxially stretched saponified ethylene-vinyl acetate copolymer film (EVAL EF-H, Kuraray Co., Ltd.) 15 μm thick was heat laminated to the plasma-treated surface of the polyethylene terephthalate film at a line pressure of 5 Kg/cm at 180° C. The interlayer adhesive strength of the laminated structure was 600 g/15 mm.

EXAMPLE 4

The plasma-treated surface of a polyethylene terephthalate sheet obtained in the same manner as in Example 1 was heat laminated to the saponified ethylene-vinyl acetate copolymer layer of the unstretched laminated structure obtained as in Example 1 at a line pressure of 2 Kg/cm at 150° C. The three-layer laminated structure was vacuum-formed to produce a cylindrical container of 7 cm diameter, 7 cm depth and 70 μm average wall thickness. The cylindrical container had excellent transparency, 500 g/15 mm interlayer adhesive strength and 0.8 ml/m²·24 hr a 25° C. oxygen gas permeability.

EXAMPLE 5

The laminated structure of Example 3 was used as a base structure. The ethylene-vinyl acetate copolymer layer of the laminated structure was coated by co-extrusion with a layer of polypropylene having carboxyl groups (Liothene M-1063-4, Toyo Ink Mfg. Co., Ltd.) 10 μm in thickness and a layer of polypropylene (Sholex Allomer FA-531, Showa Denko K.K.) 50 μm in thickness. The oxygen gas permeability of the thus formed laminated structure was 0.1 ml/m²·24 hr at 25° C. A pouch was formed of the laminated structure with the polypropylene facing layer lining the inside. The pouch was filled with an aqueous 4% acetic acid solution, and then it was retorted at 120° C. for 20 min. The interlayer adhesive strength of the pouch after pressure-and heat-sterilizing g/15 mm.

EXAMPLE 6

One side of a biaxially stretched polyamide film (Unitika EMBLEM, Unitika Ltd.) 15 μm in thickness was plasma-treated in an atmosphere of a mixture gas of argon and oxygen (1:1 by volume). The low-temperature plasma conditions were $5 \times 10^{-1}$ Torr vacuum, 500W discharge rate and 2 sec duration. The plasma-treated surface of the polyamide film was coated by conventional co-extrusion with a 15 μm thick layer of a saponified ethylene-vinyl acetate copolymer (EVAL EPF-101, Kuraray Co., Ltd.), a 10 μm thick layer of polypropylene having carboxyl groups (Liothene M-1063-4, Toyo Ink Mfg. Co., Ltd.) and a 50 μm thick layer of polypropylene (Sholex Allomer FA-531, Showa Denko K.K.) to form a multilayer laminated structure. The interlayer adhesive strength of the multilayer laminated structure was 600 g/15 mm.

COMPARATIVE EXAMPLE 4

Comparative Example 4 followed the procedure of Example 6, except that the low-temperature plasma treatment was omitted. The interlayer adhesive strength of the resultant laminate was 50 g/15 mm.

EXAMPLE 7

The surface of a 100 m thick unstretched acrylonitrile-methylacrylate copolymer film (Barex GX100, Viston Corp.) was treated with a low-temperature plasma in an atmosphere of oxygen gas at $6 \times 10^{-3}$ Torr pressure at a 400 W discharge rate for 10 sec. The plasma-treated surface was coated by conventional extrusion coating with a 200 μm thick layer of the saponified ethylene-vinyl acetate copolymer used in Example 1. The interlayer adhesive strength of the resultant laminated structure was 1000 g/15 mm. The laminated structure did not delaminate when stretched biaxially to an areal stretching ratio of approximately 6.

EXAMPLE 8

A surface of the same biaxially stretched polyethylene terephthalate film as used in Example 3 was treated with a low-temperature plasma in an atmosphere of oxygen gas of $1 \times 10^{-2}$ Torr at a 350 W discharge rate for 1 sec. The plasma-treated surface was co-extrusion coated with a 15 μm thick layer of a saponified ethylene-vinyl acetate copolymer (EVAL EPF-104, Kuraray Col, Ltd.), a 5 μm thick layer of the polypropylene having carboxyl groups used in Example 5, and a 70 μm thick layer of polypropylene (Sholex Allomer A, Showa Denko K.K.). Pouches having inner dimensions of 14 cm 10 cm were formed in a conventional manner from the resultant laminate with the polypropylene layer facing inward. Each pouch was filled with 130 ml of one of the various extractants listed in Table 2 and subjected to extraction tests under the conditions given in Table 2. Potassium permanganate consumption was measured. Results of the tests were as shown in Tables 2 and 3.

COMPARATIVE EXAMPLE 5

A biaxially stretched polyethylene terephthalate film of the type used in Example 8 and a 15 μm thick polypropylene film (Showlex Allomer A, Showa Denko K.K.) were laminated in a conventional manner with a two-component polyurethane adhesive (EPS-903/K-75, Dainippon Ink and Chemicals, Inc.). The three-layer laminated structure, and the pouches were subjected to extraction tests and potassium permanganate consumption measurement. The results of the tests and measurements are shown in Tables 2 and 3.

The amount of extractives and the potassium permanganate consumption of the laminated structures of the present invention were smaller than those for the laminated structure with the polyurethane adhesive (Comparative Example 5), proving that the former is superior to the latter form the viewpoint of safety and human health.

TABLE 2

| Extractants | Extracting Conditions | Amount of Extractives (ppm)* | |
|---|---|---|---|
| | | Example 8 | Comparative Example 5 |
| n-Heptane | 65° C. × 2 hr | 18.1, 18.0 | 20.0, 18.7 |
| Water | 120° C. × 2 hr | 2.7, 2.6 | 9.1, 8.6 |
| Aqueous 50% alcohol solution | 72° C. × 2 hr | 0.9, 0.8 | 3.4, 3.5 |
| Aqueous 3% acetic acid solution | Boil × 2 hr | 2.3, 1.8 | 9.2, 7.9 |

*The amount of extractives (ppm) was calculated on the basis of the amount of the evaporation residue of the extract. Two measurements for each test are shown.

TABLE 3

| | Example 8 | Comparative Example 5 |
|---|---|---|
| Potassium permanganate consumption (ppm) | 1.7, 2.1 | 30.0, 31.5 |

Extracting condition: 120° C. × 2 hr
Two measurements for each test are shown.

EXAMPLE 9

A surface of a 200 μm thick hard polyvinyl chloride sheet (Vinyfoil C, Mitsubishi Plastics Industries Ltd.) was subjected to a low-temperature plasma process in an atmosphere of nitrogen gas at $8 \times 10^{-3}$ Torr pressure with 500 W discharge rate for 1 sec. The plasma-treated surface was coated by co-extrusion with a 35 μm thick layer of a saponified ethylene-vinyl acetate copolymer (EVAL EPF-101, Kuraray Co., Ltd.), a 10 μm thick layer of the polypropylene having carboxyl groups used in Example 5, and a 100 μm thick layer of the polypropylene used in Example 5. The resultant laminated structure was vacuum-formed to produce a cylindrical container 7 cm in diameter, with a ½ aspect ratio and approximately 115 μm average wall thickness. The interlayer adhesive strength of the wall of the container was 500 g/15 mm.

As should be apparent from the foregoing description, treatment of a thermoplastic film or sheet, such as a polyethylene terephthalate film or sheet, with a low-temperature plasma in accordance with the present invention gives the thermoplastic film or sheet a surface which enables lamination to a layer of a saponified ethylene-vinyl acetate copolymer without using any adhesive.

We claim:

1. A process for forming a laminate suitable for use as a gas barrier packaging material, said laminate comprising (1) a thermoplastic film or sheet and (2) a saponified ethylene-vinyl acetate copolymer film or sheet, without an adhesive between (1) and (2), wherein (2) contains 20–50 mol. % ethylene and has a degree of saponification of 90 mol. % or more, said process comprising treating a surface of the thermoplastic film or sheet with a low temperature plasma at $10^{-3}$ to 1 Torr and at least 100 W for a period of time of at least 0.01 sec. and sufficient to provide a predetermined degree of adhesive strength between (1) and (2) and thermally bonding the treated surface to the saponified ethylene-vinyl acetate copolymer film or sheet.

2. The process of claim 1, wherein the thermoplastic film or sheet is a film or sheet of a member selected from the group consisting of polyesters, polyamides, polycarbonates, polyvinyl chloride, polyolefins, polystyrene and polyacrylonitrile, or a laminated film or sheet having at least one layer of one of said members.

3. The process of claim 1, wherein the thermoplastic film or sheet is polyethylene terephthalate film, or a laminated film or sheet having a polyethylene terephthalate layer.

4. The process of claim 1, wherein the thermoplastic film or sheet is uniaxially or biaxially stretched prior to thermal bonding.

5. The process of claim 3, wherein the thermoplastic film or sheet is uniaxially or biaxially stretched prior to thermal bonding.

6. The process of claim 1 wherein said low temperature plasma is in an atmosphere of a member selected from the group consisting of air, argon, nitrogen, oxygen, hydrogen, helium and mixtures thereof.

7. The process of claim 1 wherein said thermoplastic is polyethylene terephthalate.

8. The process of claim 3 wherein said thermoplastic is polyethylene terephthalate.

9. A process in accordance with claim 1 wherein said saponified film or sheet is an outermost layer of a laminated film or sheet.

10. A process in accordance with claim 1 wherein said predetermined adhesive strength is at least 400 g/15 mm.

* * * * *

UNITED STATES PATENT AND TRADEMARK OFFICE
CERTIFICATE OF CORRECTION

PATENT NO. : 4,772,348

DATED : September 20, 1988

INVENTOR(S) : HIROKAWA et al

It is certified that error appears in the above-identified patent and that said Letters Patent is hereby corrected as shown below:

```
Col. 5, line 57, "g/15mm" should read --was 600 g/15mm--
Col. 6, line 42, after "14 cm" insert --x--.
```

Signed and Sealed this

Eighth Day of August, 1989

Attest:

DONALD J. QUIGG

Attesting Officer

Commissioner of Patents and Trademarks